March 3, 1931.  A. T. HAYMAN ET AL  1,794,685
CARDIOLOGICAL INSTRUMENT AND METHOD
Filed July 13, 1928   5 Sheets-Sheet 1
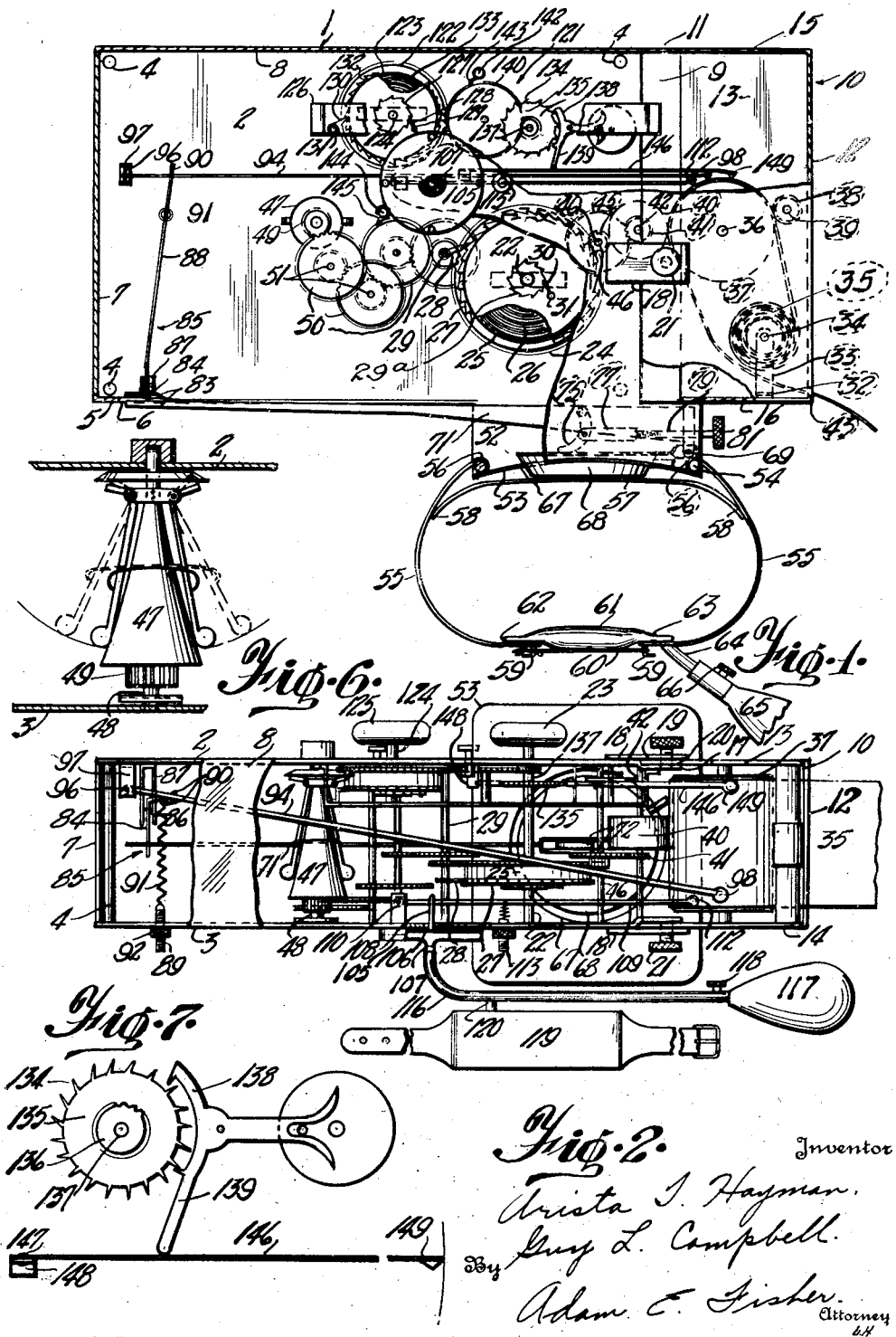

March 3, 1931. A. T. HAYMAN ET AL 1,794,685
CARDIOLOGICAL INSTRUMENT AND METHOD
Filed July 13, 1928  5 Sheets-Sheet 2
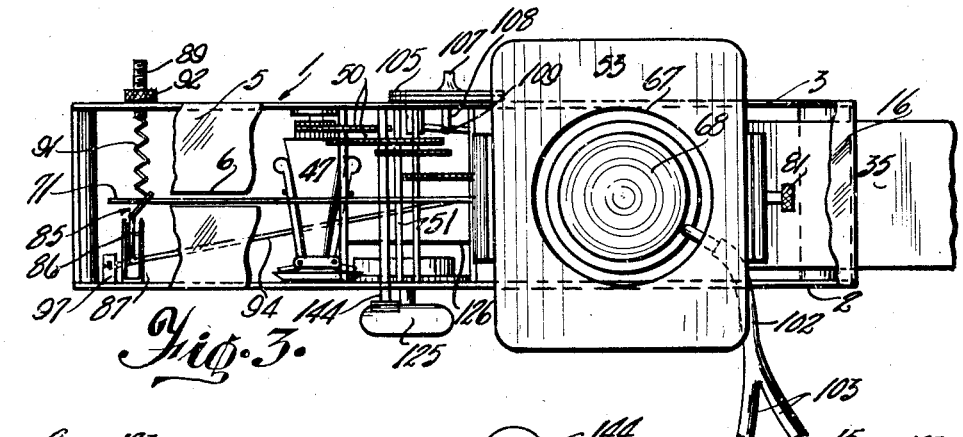
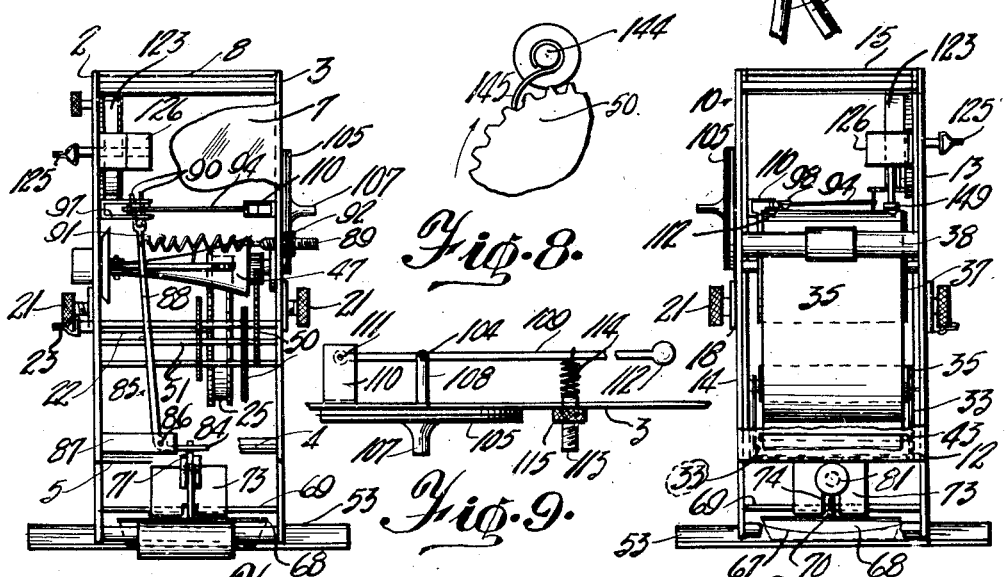
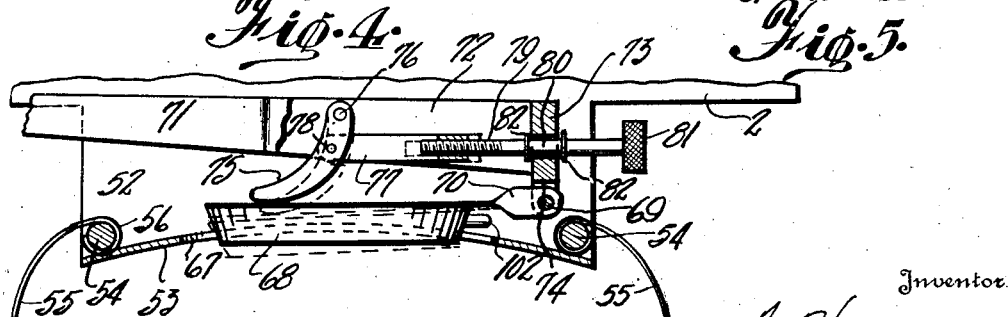
Inventor
Arista T. Hayman
Guy L. Campbell
Adam E. Fisher
By Attorney

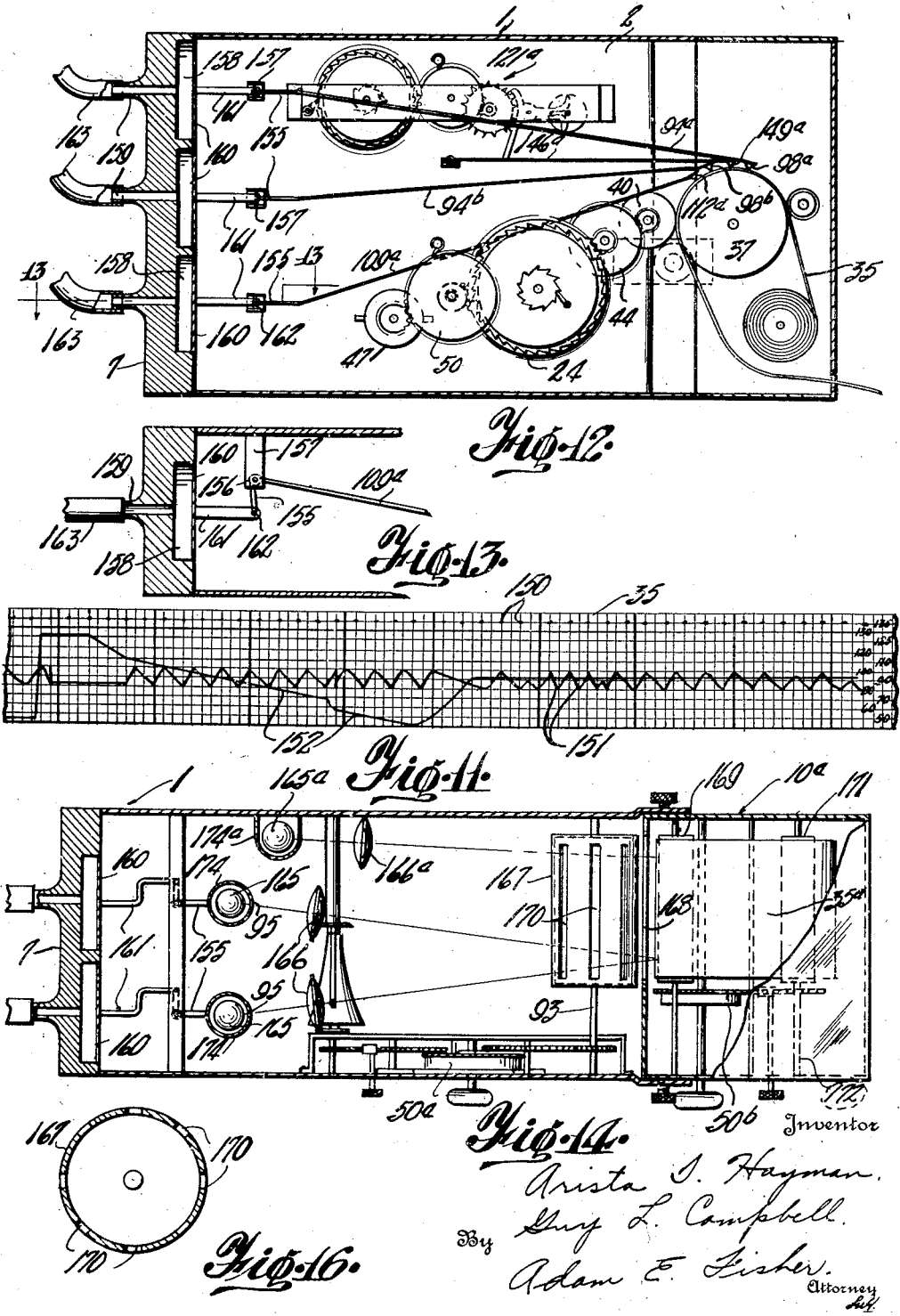

March 3, 1931. A. T. HAYMAN ET AL 1,794,685
CARDIOLOGICAL INSTRUMENT AND METHOD
Filed July 13, 1928   5 Sheets-Sheet 4

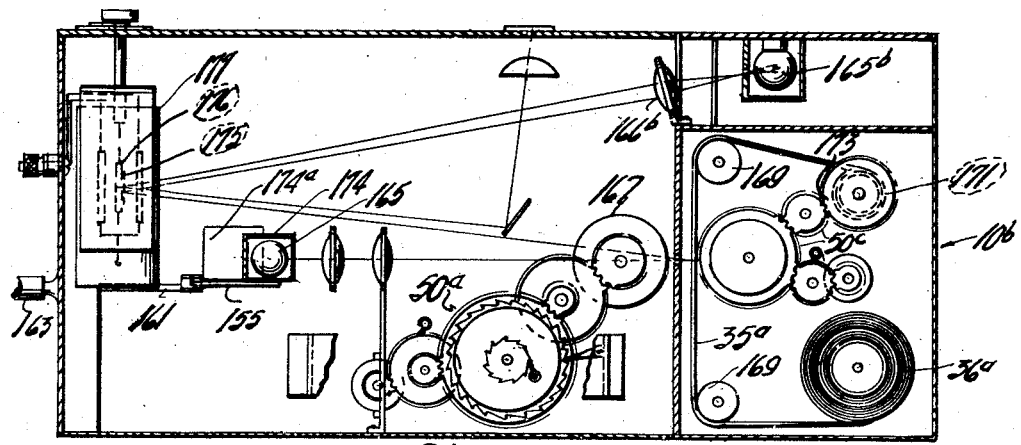

Patented Mar. 3, 1931

1,794,685

UNITED STATES PATENT OFFICE

ARISTA T. HAYMAN AND GUY L. CAMPBELL, OF ST. LOUIS, MISSOURI

CARDIOLOGICAL INSTRUMENT AND METHOD

Application filed July 13, 1928. Serial No. 292,370.

This invention relates to the science of cardiology, and to instruments and methods used in that science for the purpose of detecting, interpreting and recording the cardiac manifestations and variations of the human body, including the blood pressure and the frequency, strength and regularity of the cardiac pulsations, such instruments being commonly known as sphygmometers, sphygmomanometers, pulsimeters and the like.

The principal object of the invention is to provide a method for recording cardiac movements and conditions and a relatively simple, efficient and durable instrument of the kind stated for practising the method, and in which instrument is combined means for syncronously detecting, measuring and recording upon a common tape or other register, both the pressure of the blood stream and the frequency, strength and regularity of the heart pulsations, the said records being represented concurrently one over the other upon the tape and there being concurrently repesented upon the tape a running series of timing dots, to the end that the said records upon the tape may afford a combined, synchronized and comparative record of the diagonistic and prognostic values of the cardiac manifestations referred to. The instrument also includes in combination a stethoscope attachment for the pulsimeter element.

Another object is to provide a combined instrument adapted for synchronously measuring and recording the blood pressure of a human body, the cardiac pulsations or pulse action, and the time intervals intervening between the several pulse beats.

A further object is to provide upon a common tape or register an ultimate, complete and synchronized comparative record of the pathological conditions of the cardiac system, as manifested by the blood pressure and heart pulsations.

With these and other objects in view, as will appear in the course of this specification, attention is called to the accompanying drawings, wherein Figure 1 is a side elevation of one embodiment of the invention, portions of the case being broken away to show the arrangement of the interior mechanism;

Figure 2 is a top plan view of the assembly shown in Figure 1, portions of the cover being broken away at either end;

Figure 3 is a bottom plan view of the assembly shown in Figure 1, portions of the bottom of the casing being broken away at either end;

Figure 4 is an end view of the assembly shown in Figure 1;

Figure 5 is a reverse end view of the assembly of Figure 1 taken oppositely to the view of Fig. 4;

Figure 6 is an enlarged detail of the governor as embodied in Figure 1;

Figure 7 is an enlarged detail of the timing or time dotting mechanism as embodied in Figure 1;

Figure 8 is an enlarged detail of the stop for stopping the clock-work of the device as embodied in Figure 1;

Figure 9 is an enlarged detail of the diaphragm and lever elements of the sphygomomanometer or blood pressure recording assembly as embodied in Figure 1;

Figure 10 is an enlarged detail of the sound box or stethoscope assembly as connected with the actuating lever of the pulsimeter, as embodied in Figure 1;

Figure 11 is a plan view of an illustrative specimen of recording tape as employed in the embodiment of the invention shown in Figure 1, there being represented upon the tape the markings made by the recording pencils of the sphygmomanometer, pulsimeter and time dotter;

Figure 12 is a side view, partly in section, of another embodiment of the invention, wherein two pulsimeter levers and recording styluses are employed for recording the pulse action at two several radial arteries, in combination with a similar sphygmomanometer assembly, all of said elements being pneumatically operated;

Figure 13 is a sectional detail on the line 13—13 of Figure 12, showing the diaphragm and lever assembly of one of the levers shown in Figure 1;

Figure 14 is a plan view, partly in section, of another embodiment of the invention wherein light bulbs are oscillated pneumatically for focusing rays of light upon a sensitized film for photographically making the pulse wave record and the blood pressure wave record upon the film. A stationary timing bulb simultaneously makes the timing marks upon the margin of the same film.

Figure 16 is a detail of a form of light shutter employed in the structure shown in Figures 14 and 15;

Figure 18 is a side elevation of the elements represented in Figure 17, properly assembled;

Figure 19 is a plan view of the embodiment shown in Figures 17 and 18;

Figure 22 is a detail of a form of ink stylus adaptable for use with several of the described embodiments of this invention.

Figure 15:
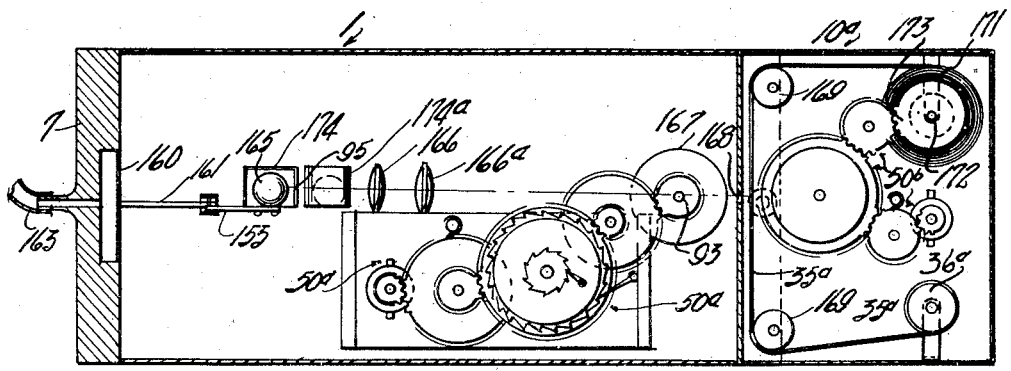
Figure 15 is a side elevation of the embodiment shown in Figure 14.

In the first of the illustrative embodiments of the invention as shown in Figures 1, 2, 3, 4, 5, 6, 7, 8, 9, 10, a suitable rectangular case 1 is provided, consisting of side plates 2 and 3 held together in spaced relation by spacing pins 4, a bottom plate 5 having a lever slot 6, an end plate 7 and a removable top plate 8. The end 9 of the case opposite to the end plate or end 7 is left open, but is adapted to be normally closed by a removable tape roll holder 10, which in effect, when mounted in place, forms a continuation of the case 1, as it is open at the end 11 connecting with the open end 9 of the case 1, but is closed at the other end 12, at the sides 13 and 14, at the top 15 and bottom 16. For the purpose of removably connecting the tape holder 10 with the case 1, the ends of the side plates 2 and 3 of the case are inset at the open end 9 as shown at 17 and tabs 18 are extended from medial points of the side plates out over the inset ends thereof, thus providing clefts 19 into which the margins 20 of the sides 13 and 14 of the holder 10 may be inserted. Set screws 21 are then passed through the tabs 19 and the margins 20, and are threadedly seated in the inset ends 17 of the plates 2 and 3. A winding spindle 22 is journaled transversely through the case 1 and a winding knob 23 is rigidly mounted upon an outer extended end thereof.

A main drive gear 24 and attached spring drum 25 are journaled upon the spindle 22. A flat, spiral drive spring 26 is mounted within the drum 25, the inner end of the spring being secured to the spindle 22, while the outer end is secured to the periphery of the drum 25. A peripheral ratch 27 is formed upon the outer end of the drum 25 and a pawl 28 engages this ratch, the pawl being pivotally supported upon an adjacent spindle 29 to be later again referred to.

The ratch 27 and pawl 28 are so arranged as to prevent a corresponding rotation of the gear 24 upon the winding of the spring 26. A small ratch wheel 29ª, the teeth of which are reversed relative to the ratch 27, is rigidly mounted upon the spindle 22 at the side of the drum 25, and a pawl 30, pivoted at 31 to the outer face of the drum 25, plays upon the ratch wheel 29 in such a way that the spring 26 may be readily wound up and when wound the driving power thereof will be transmitted to the gear 24, in a conventional manner.

Within the lower portion of the tape roll holder 10 is arranged a bracket 32, the spaced, resilient arms 33 of which releasably support a roll carrier rod 34 upon which is mounted a tape roll 35. Medially through the holder 10 is passed a spindle 36 upon which is rotatably mounted a friction roll 37. The tape 35 is trained up over the roll 37, at the outer side of the roll, and an idler roll 38 upon a spindle 39 supported between the sides of the holder 10, bears upon the traveling tape and acts to hold it snugly against the roll 37. After passing over the roll 37 the tape is led down and out through a tape slot 43 in the outer face of the holder 10. A friction drive spool 40 and a pinion 41 are rigidly mounted upon a spindle 42 journaled at its ends in the sides of the case 1 at the open end 9 thereof, and so that the spool 40 will frictionally bear upon the roll 37 and the tape 35 as the latter passes therebetween. The drive gear 24 is connected with the pinion 41 through an intermediate speed augmenting gear 44 and pinion 45 rigidly mounted upon a spindle 46 journaled in the sides of the case 1. The gear 44 is placed in mesh with the pinion 41 and the gear 24 is placed in mesh with the pinion 45, and thus the driving power of the spring 26 is transmitted to the drive spool 40 in an increased speed ratio. The spring 26 is, of course, so placed within its drum 25 that the train of gearing described will finally rotate the spool 40 so as to force the tape 35 down and out through the slot 43. Any conventional form of speed governor 47 is mounted in the case 1 oppositely to the mechanism already described, and may be supported upon a spindle 48 journaled in the sides of the case. Upon the spindle 48 is mounted a pinion 49 which is connected with the drive gear 24 through a train of speed augmenting gears and pinions 50 assembled upon spindles 51 journaled in the sides of the case 1, all in a well known manner. A stop pin 144 is journaled through the plate 2, its inner end carrying a cam 145 adapted to impinge the adjacent gear upon the turning of the pin, thereby stopping the mechanism when desired. The side plates 2 and 3 of the case 1 are extended downwardly at the under side of the case and at the open end 9 thereof, as shown at 52, and an upwardly convexed base plate 53 is mounted at the lower extremity of the extensions 52. Two strap supporting rods 54 connect the lower outer corners of the extensions 52 transversely of the case 1. Two outwardly curved metal pulsimeter straps 55, formed into hooks 56 at one end for releasably engaging the rods 54, are provided, and these straps are joined by a flexible contact element 57 which is secured at its ends 58 to the upper ends of the said metal straps 55. A plurality of lacing hooks 59 line the margins of the lower, adjacent ends of the straps 55, and a cord lace 60 passed back and forth behind these hooks, after the manner of lacing a shoe, affords means for securing the instrument as a whole upon the wrist or arm of a patient immediately over some radial artery or in any desired location. A conventional form of air pressure bag 61 is fastened at one end 62 to the lower inner margin of one of the straps 55 while the free end 63 is adapted to be disposed upon the lower margin of the opposite strap 55, the bag itself resting upon the intervening lacing 60. From the bag 61 is extended the usual inflation tube 64 which connects with the elastic and valved air pressure bulb 65 as means for inflating the bag 61. A screw valve 66 is provided in the neck of the bulb 65 for sustaining the inflation of the bag 61 as may be required. A circular aperture 67 is formed through the base plate 53, and a flat, circular and hollow sound box 68 is loosely seated therethrough and adapted to bear upon the flexible element 57. A bearing pin 69 is extended transversely between and connects the two lower, outer corners of the extensions 52 of the plates 2 and 3. The box 68 is hingedly secured to this pin by means of a link 70 extended from the box and having its outer end loosely engaging the pin 69 which passes through that end. A pulsimeter actuating lever 71 having a forked or bifurcated end portion 72, the extremities of which are connected by an end lug 73, is hingedly mounted by the said lug 73 to the pin 69 by loosely passing the latter through the lower margin of the former, the said lug 73 being formed with a recess 74 adapted to accommodate the outer end of the link 70.

A curved pressure shoe 75 is loosely pinned by a pin 76 inside the forks of the bifurcated end 72 of the lever 71, the said shoe being adapted to bear down upon the upper face of the box 68. A link 77 is provided, the same having a bifurcated end embracing the shoe 75 and being loosely pinned to the said shoe through the split end of the link by a pin 78. The outer end of the link 77 is tapped longitudinally to engage an adjustment screw 79, the shank of which is journaled at 80 through the end lug 73 of the lever 71, and ends in an outer knurled head 81. Stops 82 are secured to the shank of the screw 79 at each side of the lug 73 to prevent longitudinal movement of the screw relative to the lug 73. Thus by turning the screw 79 into or out of the link 77, the shoe 75 may be caused to press down upon the box 68, or such pressure may be removed from the box, as desired, the said box being in turn forced down into or withdrawn from the flexible element 57; and it will be noted that the shoe 75 is thus braced between the lever 71 above, and the box 68 below. The utility of the arrangement of these elements as described and assembled, and the function and purpose of the pressure shoe 75 relative to the box 68, will be shown later.

The free end of the lever 71 is extended towards the opposite end of the case 1 along and through the lever slot 6, and is forked as shown at 83. This forked end embraces the angularly bent finger 84 of a bell crank lever 85 which is fulcrumed upon a pin 86 passed through a bracket 87 extended inwardly from the side plate 2 of the case 1. The other finger 88 of the lever 85 is extended through the case 1 perpendicularly to the top and bottom thereof and ends in the forked extremity 90. Thus the lever 71 is adapted to oscillate in a plane parallel with the plate 2, while the lever 85 is adapted to oscillate in a plane perpendicular to the plate 2, and parallel with the end plate 7. An adjustment screw 89 is passed loosely through the opposite side plate 3 in transverse alignment with the free, forked extremity 90 of the lever 85. One end of a tension spring 91 is fastened to the inner end of the screw 89 and the opposite end of the spring is secured to the extremity 90 of the lever 85. A knurled nut 92 at the outer end of the screw 89 affords means for adjusting the tension of the spring 91, thereby increasing or decreasing the pull of the spring 91 upon the lever 85. The normal action of the spring 91 is to draw the lever 85 over towards the side 3 of the case 1.

A pulsimeter recording lever 94 is extended longitudinally through the top portion of the case 1 from the closed end 7 out through the open end 9 thereof. The inner end of the lever 94 is passed through the forked end 90 of the lever 85 and is pivoted by a pin 96 within a bracket 97 upon the side plate 2, in such a manner as to adapt this lever to oscillate in a plane parallel with the top plate 8. The outer free end of the lever 94 carries a conventional form of marking or tracing stylus 98 which bears upon the tape 35 as the same passes over the roll 37 and makes a tracing upon the said tape as it travels. One adaptable form of such stylus is to provide an ink holding recess 99 in the stylus with a small aperture 100 leading therefrom down to the tape 35. The normal action of the spring 91 is to draw the stylus 98 over towards that margin of the tape 35 adjacent the side 14 of the tape holder 10, while the inward movement of the lever 71, brought about by the outward pressure of the box 68 upon the shoe 75, tends to push the stylus 98 over towards the opposite margin of the tape 35, through the action of the bell crank lever 85 upon the lever 94, as described. A flexible air tube 102 is connected to and communicates interiorly with the sound box 68 and this tube is branched as shown at 103, the branches being connected with conventional ear phones (not shown), and the said assembly of box, tubes and phone constitute a form of stethoscope to enable the physician to "listen in" to the operation of the instrument as influenced by the pulse or heart beats of his patient, while the entire assembly so far described may be collectively referred to as the pulsimeter assembly.

A circular aperture is cut through the side plate 3 at a medial point, and a circular, disk-like diaphragm case 105 having one side open is provided and mounted over this aperture with the open side of the case in register with the plate aperture, and within the said case is arranged a circular, resilient diaphragm 106, the periphery of the diaphragm being sealed to the inner periphery of the case in an air-tight manner. A nipple 107 is connected with the outer side of the case 105 and communicates with the interior of the case at the outer face of the diaphragm 106. A lever pin 108 connects with and extends from the inner face of the said diaphragm inwardly of the case 1 through the said aperture in the plate 3. A sphygmomanometer lever 109 has its inner end pivoted within a bracket 110 extended from the plate 3, by means of a pin 111, the free outer end of the lever 109 being extended out through the open end 9 of the case 1 and ending in a stylus 112 similar to the stylus 98 of the lever 94, and bearing in like manner upon the tape 35 as the same passes over the roll 37. The inner, forked end of the lever pin 108 is then set over the inner end of the lever 109 at a spaced distance, loosely connected thereto by a pin 104. The lever 109 and its stylus 112 are thus arranged to move laterally within the case 1, the stylus being adapted to traverse the tape 35 from margin to margin in manner similar to the stylus 98. And in order that the levers 94 and 109 and their styluses 98 and 112 may not interfere with one another in their lateral movement, one lever and stylus, as 109—112, is disposed somewhat below the other lever and stylus 94—98, as shown in the drawing. An adjustment screw 113 is passed loosely through the plate 3 in alignment with the lever 109 and the inner end of this screw is secured to a retractile coil spring 114 having its inner end fastened to the lever 109. A nut 115 threadedly engages the outer end of the screw 113 and affords means of adjusting the tension of the spring 114. This screw and spring are adapted to normally draw the lever 109 over towards the side 3 of the case, although allowing it to be resiliently forced towards the opposite side.

A flexible inflation tube 116 connects with the nipple 107 and ends in an elastic air pressure bulb 117, equipped with the screw valve 118. A conventional form of pneumatic tourniquet 119 is provided for strapping around the arm for temporarily stopping the flow of blood through an artery, in the process of calculating the blood pressure, and this tourniquet connects through a branch tube 120 with the tube 116. Pressure upon the bulb 117 will both inflate the tourniquet 119 and will simultaneously force the diaphragm 106, lever 109 and stylus 112 inwardly against the action of the spring 114. The assembly last described may be collectively referred to as the sphygmomanometer assembly.

A time dotter mechanism designated generally by the numeral 121 is supported within the case 1 at the inner side of the plate 2. In the embodiment shown, this mechanism includes a driving assembly of gear wheel 122 and attached spring drum 123 journaled upon a spindle 124. The outer end of the spindle is journaled through the plate 2 and ends in the winding knob 125. The inner end of the spindle is journaled in the bracket 126 mounted upon the inner side of the plate 2. A ratchet 127 is rigidly mounted upon the inner end of the spindle. A pawl 128 is pivoted at 129 upon the inner face of the drum and engages the ratchet 127. Another pawl 130 is pivoted at 131 to the bracket 126 and engages a peripheral ratchet 132 carried by the drum 123. A clock spring 133 is coiled within the drum 123, having its ends attached to the periphery of the drum and to the spindle 124. A conventional form of clock escapement 134 is mounted upon the inner side of the plate 2 in longitudinal alignment with the elements last described, the escapement wheel 135 carrying a pinion 136 and being rotatably pinned at 137 to the plate 2. The oscillating pallet 138 of this escapement is provided with a projecting lever striking lug 139. An intermediate gear wheel 140 is rotatably pinned to the plate 2 and is placed in mesh with the gear wheel 122 on the one side and the pinion 135 on the other side, thereby transmitting the drive action of the spring 133 to the escapement 134. A rotatable stop pin 142 is journaled through the plate 2, its inner end carrying a cam 143 adapted to impinge the gear 140 upon the turning of the pin, thereby stopping the mechanism 121, as may be desirable.

A time dotter lever 146 is longitudinally mounted through the open end 9 of the case 1, adjacent to the plate 2 and in parallelism with the levers 94 and 109. The inner end of the lever 146 is loosely pinned at 147 within a bracket 148 upon the plate 2 in such manner that the lever may oscillate or vibrate in a plane parallel with the plate 2, but may not move laterally as do the levers 94 and 109, as described. The outer end of the lever 146 carries also a marking stylus 149 similar to the styluses 98 and 112 of the levers 94 and 109. The lever 146 is thus arranged adjacent the side plate 2 and its stylus 149 is adapted to vibrate or oscillate perpendicularly to the tape 35 as same passes over the roll 37, impinging that tape and making a time interval dot at that margin of the tape at each vibration of the stylus 149. The lever 146 is made to vibrate by the striking lug 139, which is adapted to strike or impinge the lever 146 at each cyclic movement of the pallet 138 as caused by the spring 133 and gear train described. Thus each cyclic movement of the pallet 138 results in a time dot being made upon the traveling tape 35 synchronously with the markings made by the other two levers 94 and 109 through their styluses 98 and 112.

The lever 146 being disposed over at the side of the case 1, that lever as well as stylus 149, is outside the path of lateral swing of the levers 94 and 109, and thus there is no danger of interference; but the lever 146 may be mounted somewhat above the levers 94 and 109 as shown, as an additional safeguard against such interference. In order that the several styluses, 98, 112 and 149, may not interfere with one another, their points of contact with the tape 35 upon the roll 37 are arranged in different radial planes passing through the axis of the said roll 37, as shown in the drawing. The assembly of elements last described may be referred to collectively as the time dotter assembly.

In the use of the invention in the embodiment just shown, the case 1 is strapped upon the patient by locating the contact element 57 of the pulsimeter assembly immediately over the radial artery within the pit of the elbow, and with the sound box 68 of the pulsimeter assembly resting upon the element 57 over this artery. The tourniquet 119 of the sphygmomanometer assembly is then strapped around the arm just above the elbow, in the usual manner. The pulsimeter air bag 61 is then inflated, and the adjustment screw 81, which controls the pressure of the shoe 75 upon the box 68, is turned in or out as may be required to properly adjust the box 68 in snug contact with the artery. The mechanisms are then set in operation by releasing the two stops 142 and 144, which of course starts the tape 35 moving over the roll 37 and out through the slot 43 in the end of the case 1, and also starts the time dotter stylus 149 tapping the strip of tape 35 as it travels, thereby marking along that margin of the tape an equi-spaced series of dots 150 representing regular time intervals between the dots. With the head-phones connected with the tube 102 upon his ears, the physician now gradually inflates the tourniquet 119. As the tape 35 travels there will now be synchronously traced thereupon, three individual but coordinated and synchronized sets of markings or tracings, to-wit; the time dots 150 made by the stylus 149, the pulse wave-line or tracing 151 made by the pulsimeter stylus 98, and the blood pressure wave line or tracing 152 made by the sphygmomanometer stylus 98.

The time dots 150 are made in manner already described, the pulse wave-line or markings 151 are made by the lateral fluctuations of the lever 94 caused by the mechanism hereinbefore described and explained, as influenced by the alternate distensions and contractions of the arterial walls of the radial artery over which the instrument is mounted, and the blood pressure wave-line or tracings 152 are caused by the lateral fluctuations of the lever 109 under the influence of the air pressure in the tourniquet 119 as pumped in or released by the hand of the physician. It will be noted that the two sets of wave-lines represented by the tracings 151 and 152 may and frequently do cross and recross one another in the practical use of the instrument.

It will also be noted that the styluses 149, 98 and 112 contact with the tape 35 upon the roll 37 in a stepped sort of order, one following the other in the order named, and that their respective markings 150, 151 and 152, would therefore of course stand in the same relation. The physician will take this fact into consideration in reading and interpreting the combined system of markings. This stepped arrangement of the said markings is not necessary per se, however, but results of mechanical necessity with the embodiment and assembly as just described. The physician thus is provided with a combined and synchronized comparative record, upon a common tape, of the cardiac conditions and pulsations as made manifest through this instrument and as influenced by variations of the pressure of the tourniquet upon the arteries; and he may readily interpret pathologically, one set of markings by the other and each by or with reference to the series of time dots upon the margin of the tape. Also with his earphones in place, the physician may listen in to the sibilations, transmitted through the sound box 68, of the pulsating blood stream passing through the arteries under variations of pressure of the tourniquet, and he is enabled to interpret the pathological meaning of these sounds in connection with the other manifestations and records of the instrument.

In another or second embodiment of the invention as illustrated in Figures 12 and 13, in combination with the sphygmomanometer lever 109a, two pulsimeter levers 94a and 94b are employed instead of only the one as shown at 94 in the first described embodiment, these levers carrying styluses 112a, 98a, and 98b, all bearing upon the tape 35 passing over the roll 37, the said roll being actuated and controlled by clock mechanisms and gears 24—40—44 and 47—50 as shown in the first described embodiment. These several levers are all operated pneumatically, being provided with bell crank shafts 155 fulcrumed at 156 to brackets 157 extended from the case 1. Circular diaphragm recesses 158 are formed in the end plate 7 of the case 1, and communicating nipples 159 extend from these recesses. Circular diaphragms 160 are mounted over the open sides of the recesses 158 with sealed joints. Lever pins 161 then connect these diaphragms with the bell cranks 155, being loosely pinned thereto at 162. The same form of time dotter mechanism 121a, including a lever 146a and stylus 149a, is provided for this embodiment as for the first described embodiment of the invention. Flexible air tubes 163 extend from the nipples 159 to a conventional form of pneumatic tourniquet (not here shown but similar to the element 119 shown in Figure 2 of the first described embodiment). These tourniquets are adapted for attaching to the person of the patient upon the wrist, arm, leg or throat, as the physician may desire. When inflated, the air pressure from the tourniquet with which is connected the sphygmomanometer lever 109a, operates to laterally deflect that lever and to make upon the tape 35 a wave-line tracing similar to that shown at 152 in Figure 11, in the description of the first embodiment, while the other two tourniquets, being located over radial arteries, transmit pneumatically the pulsations thereof through the air tubes 163 to the levers 94a, 94b and styluses 98a, 98b, thereby synchronously making two corresponding pulse-wave tracings upon the tape 35, similar to that shown at 151 in Figure 11. Synchronously the time dotter mechanism 121a makes its regular series of time dots along the margin of the tape, and which dots are similar to the dots shown at 150 in Figure 11, as designated and described relative to the first embodiment of the invention. Through the use of two pulsimeter levers and styluses, the physician is enabled to take readings and records from two separate radial arteries simultaneously, for the purposes of comparison.

In another, or third embodiment of the invention illustrated in Figures 14, 15, 16, two pneumatically operated diaphragms 160 and lever assemblies 155—161 are employed and arranged side by side at the end 7 of the case 1, these assemblies being operated in manner identical with that described in reference to the second described embodiment of the invention illustrated in Figures 12 and 13. But in lieu of the mechanical levers 94b, 109a, and styluses 98b, 112a, as there employed, small light bulbs 165 are used, the same being seated within sconces 174 mounted at the free ends of the bell cranks 155 and thereby being adapted to oscillate laterally as these levers 155 are moved under the impulses of the diaphragms 160. The rays from the bulbs 165 pass out through apertures 95 in the sconces and thence through focusing lenses 166 mounted in proper alignment and spaced relation between the bulbs 165 and a hollow, cylindrical shutter 167 upon the spindle 93 journaled transversely at the open end 9 of the case 1, closely over the window-slot 168 of a camera 10a which is extended at that end of the case, being in fact a substitution for the tape roll holder 10 of the first described embodiment herein. The shutter 167 is provided with a plurality of elongated light slots 170, which upon the rotation of the shutter, intermittently admit light rays from the bulbs 165 into the camera 10a. The shutter 167 is rotated by governor controlled clock mechanism 50a, similar to the mechanism 50 of the first described embodiment herein. A roll of photographically sensitized film 35a is rotatively mounted in the lower part of the camera 10a upon the roll 36a journaled in the sides of the camera, and is trained over rollers 169 across the window slot 168 and thence is rewound upon a roll 171 upon a spindle 172 journaled in the sides of the camera. The roll 171 is rotated by a governor controlled spring actuated clock mechanism 50b supported upon spindles journaled in the sides of the camera 10a, as shown, and including an intermeshing gear 173 upon the spindle 172, as shown. With this arrangement, the light rays from the bulbs 165 filter intermittently through the shutter 167 and window 168 and fall upon the film 35a, and the lateral fluctuations of these rays caused by the oscillations of the bulbs 165 produce upon the film photographic markings 151a and 152a representing and characterized by the cardiac manifestations of the body, and corresponding to the tracings 151 and 152 of the first described embodiment of this invention. In this embodiment, the equivalent of the time dots 150 of the first embodiment may be produced by an additional and fixed bulb 165a in a sconce 174a and lens 166a located at one side and so as to throw its rays through the shutter 167 upon the margin of the film 35a, thereby reproducing time markings 150a. Inasmuch as the shutter 167 rotates with a constant speed, the time marks 150a would be equispaced and would represent equal intervening time intervals. Of course the lateral oscillations of the other bulbs 165 would be limited so as to not interfere or mingle with the time marks. In this assembly either of the light bulbs 165 may be employed to photographically record the arterial pulsations, as may be desired, and the other bulb to record the blood pressure fluctuations.

Figure 17:
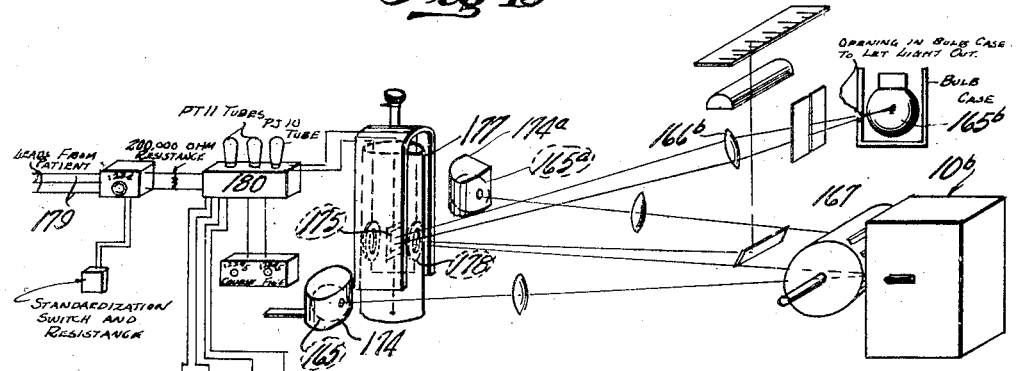
Figure 17 is a diagrammatical view of another embodiment of the invention, wherein are combined a standard form of magnetically operated pulsimeter, and a pneumatically operated sphygmomanometer, the same carrying light bulbs whose fluctuations, as well as the interrupted rays of the timing bulb, are photographically recorded upon the film.
Figure 20:
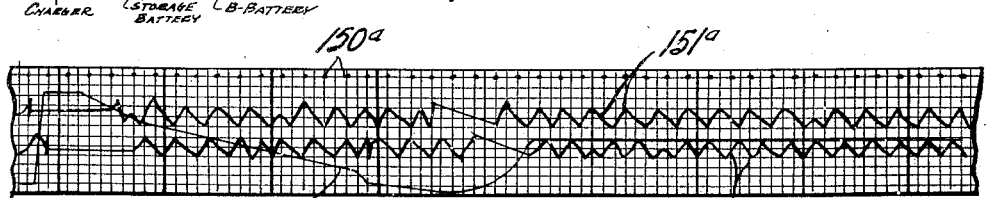
Figure 20 is a plan view of an illustrative specimen of recording tape as employed in the embodiment of the invention shown in Figure 12, there being represented upon the tape the markings made by the two pulsimeter styluses, the sphygmomanometer stylus and the time dotter stylus.
Figure 21:
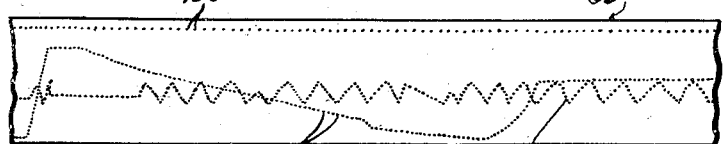
Figure 21 is a plan view of an illustrative specimen of the sensitized recording film used in the embodiment of the invention shown in Figures 17, 18, 19, there being photographically represented thereupon the markings made by the magnetically operated pulsimeter, the pneumatically operated sphygmomanometer and the time dotter.

In another, or fourth embodiment of the invention shown in Figures 17, 18, 19, the pneumatically operated light bulb 165 of the pulsimeter assembly which registers upon the film 35a the pulse fluctuations, is replaced by a small magnetically oscillated mirror 175 attached to a small iron vane 176 which is suspended within a cell 177 of clear oil of the requisite viscosity. This vane 176 is oscillated by two solenoidal coils 178 so placed that the amplified body current from the patient passing through the coils varies the magnetic field, thereby causing the vane 176 and mirror 175 to oscillate or shift laterally. The fluctuations of the mirror are then recorded upon the film 35a by a ray from a small light bulb 165b passed through a lens 166b to the mirror and back into the camera 10b. In this arrangement the current is led from the contact element (not shown) properly located over a radial or pulsating artery through leads 179 and passed through an amplifying system 180 similar to those used in radio receivers. No invention is claimed for this described method of current amplification, or magnetic control of the mirror, or method of projecting the light ray from the mirror onto the film, except only as the same is drawn into combination with the other elements of this embodiment now to be pointed out. These other elements include a pneumatically operated sphygmomanometer assembly similar to the corresponding structures shown in Figures 14, 15 and 16 of the third described embodiment, and consisting of a light bulb 165 within its sconce 174, the latter being mounted at the end of the bell crank 155 which is in turn operated by the diaphragm 160 and lever pin 161. Similarly, a timing bulb 165a is provided. The rays from the bulbs 165 and 165a are projected through the shutter 167 into the camera 10b, where they are recorded upon the film 35a concurrently with the ray from the bulb 165b of the pulsimeter assembly. The film 35a is similarly passed over rolls 36a, 169, 171, and the roll 171 is driven by a gear train 50c similar to the train 50b of the structure shown in Figures 14, 15, of the third described embodiment. The driving mechanism 50a for the shutter 167 is also similar to that shown in the third described embodiment. This embodiment is, therefore, simply a combination of a magnetically operated pulsimeter, a pneumatically operated sphygmomanometer and a timer, the movements of the three elements being synchronously and photographically recorded upon a film.

Those several embodiments and combinations of physical and mechanical principles and elements have here been shown and described as means for utilizing and carrying out the proposed method of synchronously detecting, interpreting and recording the various cardiac phenomena of the human body; as conventionally attended to by physicians. Other devices and combinations might also be employed, or variations made from the specific structures here shown, without departing from the spirit of the invention, as defined in the appended claims.

We claim:

1. In an instrument of the kind described, a frame, a stethoscopic sound box hingedly mounted in the frame for bodily movement and adapted to be actuated by contact with a radial artery, and recording means provided with a pressure shoe and bearing against the stethoscopic sound box and adjustable to regulate the pressure and actuated by the stethoscopic sound box for operating the recording means.

2. In an instrument of the kind described, a frame, pulsimeter straps connected with the frame at spaced points, a stethoscopic sound box mounted in the frame for bodily movement between the points of attachment with the pulsimeter straps, recording means actuated by the stethoscopic sound box and provided with a pivoted pressure shoe bearing against the stethoscopic sound box and adjustable to vary the pressure.

3. In an instrument of the kind described, a frame, pulsimeter straps connected to the frame at spaced points, a flexible contact element located between the attached portions of the pulsimeter straps and having an aperture, a bodily movable stethoscopic sound box operating through the aperture, and recording means actuated by the bodily movement of the stethoscopic sound box.

4. In an instrument of the kind described, a frame, pulsimeter straps connected to the frame at spaced points, a flexible contact element located between the attached portions of the pulsimeter straps and having an aperture, a bodily movable stethoscopic sound box operating through the aperture, recording means actuated by the bodily movement of the stethoscopic sound box, and including a lever having a pivotal connection with the stethoscopic sound box, a pressure shoe carried by the lever and bearing against the stethoscopic sound box, and an adjusting screw mounted on the lever and connected with the pressure shoe.

5. In an instrument of the kind described, a frame, pulsimeter straps attached to the frame at spaced points, a flexible plate connecting the attached portions of the straps and provided with an aperture, a stethoscopic sound box operating through the aperture of the contact plate, and recording means actuated by the stethoscopic sound box and including a lever movably connected with the stethoscopic sound box and provided with adjustable pressure means for engaging the stethoscopic sound box at a point spaced from the point of connection of the lever and the stethoscopic sound box.

ARISTA T. HAYMAN, M. D.
GUY L. CAMPBELL.